(12) United States Patent
Roessl et al.

(10) Patent No.: US 10,627,532 B2
(45) Date of Patent: Apr. 21, 2020

(54) DEAD-TIME CALIBRATION FOR A RADIATION DETECTOR

(71) Applicant: KONINKLIJKE PHILIPS N.V., Eindhoven (NL)

(72) Inventors: Ewald Roessl, Ellaru (DE); Roger Steadman Booker, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/300,107

(22) PCT Filed: Jun. 7, 2017

(86) PCT No.: PCT/EP2017/063809
§ 371 (c)(1),
(2) Date: Nov. 9, 2018

(87) PCT Pub. No.: WO2017/211880
PCT Pub. Date: Dec. 14, 2017

(65) Prior Publication Data
US 2019/0146098 A1 May 16, 2019

(30) Foreign Application Priority Data
Jun. 7, 2016 (EP) ..................................... 16173344

(51) Int. Cl.
*G01T 1/17* (2006.01)
*G01N 23/04* (2018.01)
(Continued)

(52) U.S. Cl.
CPC .............. *G01T 1/171* (2013.01); *G01T 1/247* (2013.01); *G01T 7/005* (2013.01)

(58) Field of Classification Search
CPC ......... G01T 1/171; G01T 1/17; G01N 23/046; H04N 5/32; H04N 5/3655; H04N 5/30
See application file for complete search history.

(56) References Cited

U.S. PATENT DOCUMENTS 6,410,920 B1 6/2002 Shao
7,263,167 B2 8/2007 Walter
(Continued)

FOREIGN PATENT DOCUMENTS

WO 2013/144812 10/2013

OTHER PUBLICATIONS

Cammin, et al., "A tabletop clinical x-ray CT scanner with energy-resolving photon counting detectors", SPIE, vol. 7961, No. 79611S, Dec. 31, 2011.
(Continued)

*Primary Examiner* — Don K Wong
(74) *Attorney, Agent, or Firm* — Larry Liberchuk

(57) ABSTRACT

The invention relates to a correction device (8) for a radiation detector (2) including detector elements each for detecting incident photons. The correction device (8) is configured to read detection signals representative of an incident photon flux detected by the detector elements for different incident photon fluxes, and an evaluation unit (11) configured to determine for each detector element a dead time of the detector element and a parameter representative of an effective area of the detector element on the basis of a collective evaluation of the detection signals of the respective detector element. Further, the correction device (8) is configured to determine for each detector element correction parameters to compensate for differences in the effective areas and in the dead times of the detector elements on the basis of the determined parameters representative of the effective area and the determined dead times of the detector elements.

15 Claims, 2 Drawing Sheets

(51) Int. Cl.
*G01T 1/24* (2006.01)
*G01T 7/00* (2006.01)

(56) References Cited

U.S. PATENT DOCUMENTS

| 9,846,244 B2 * | 12/2017 | Abraham | H04N 5/32 |
|---|---|---|---|
| 2005/0123090 A1 | 6/2005 | Heismann | |
| 2014/0326894 A1 | 11/2014 | Abraham | |
| 2015/0063527 A1 | 3/2015 | Daerr | |
| 2015/0234059 A1 | 8/2015 | Roessl | |

OTHER PUBLICATIONS

Danon, et al., "Dead time and pileup in pulsed parametric X-ray spectroscopy", 2004 Elsevier.
Abbene, et al., "High-rate dead-time corrections in a general purpose digital pulse processing system", J. Synchrotron Rad. (2015). 22, 1190-1201.

* cited by examiner

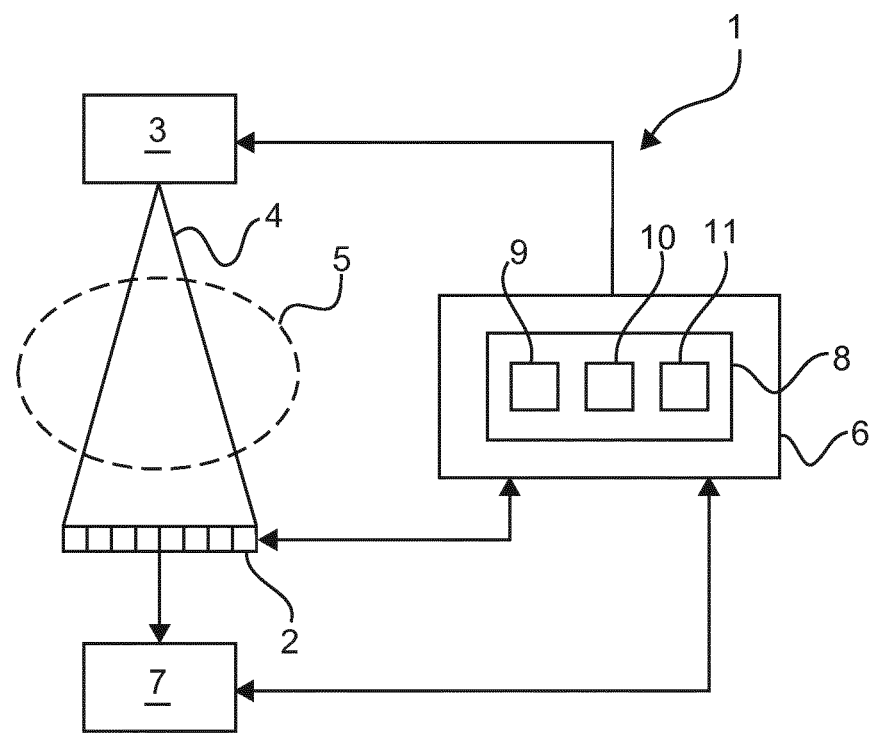
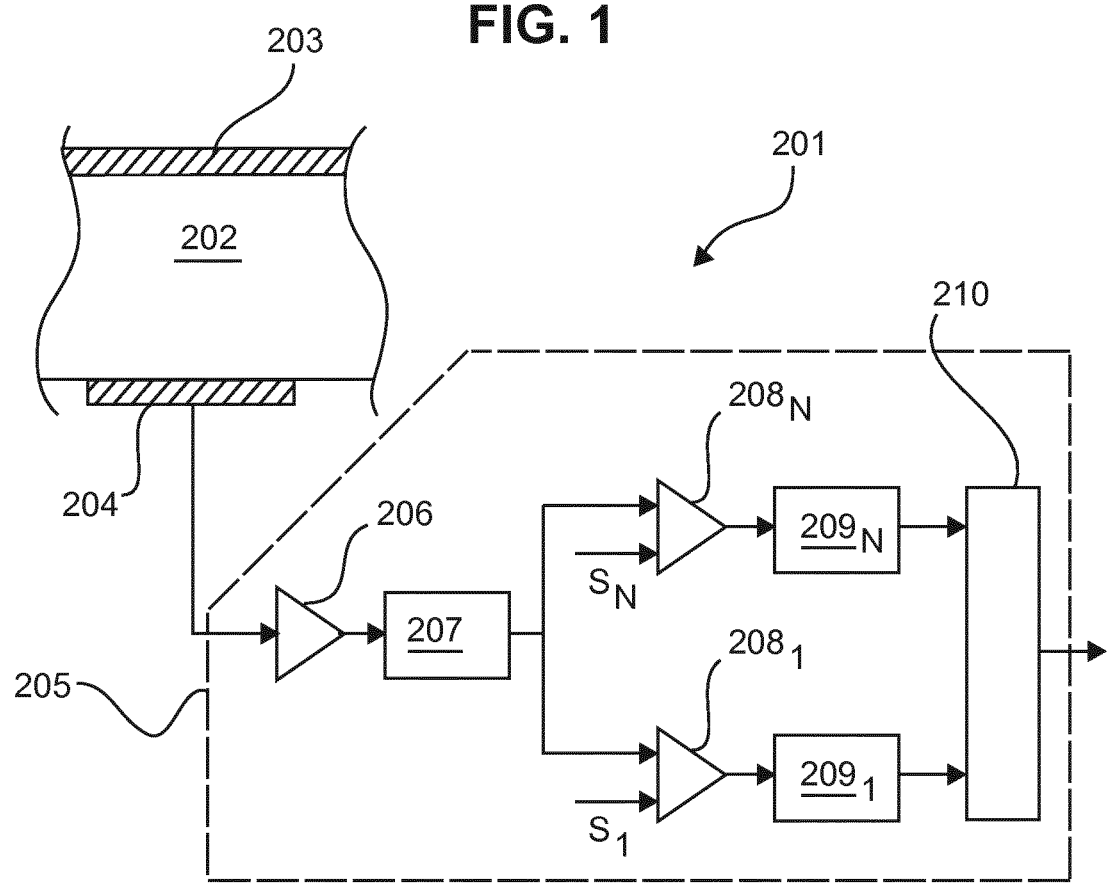
FIG. 1
FIG. 2

DEAD-TIME CALIBRATION FOR A RADIATION DETECTOR

CROSS REFERENCE TO RELATED APPLICATIONS

This application is the U.S. National Phase application under 35 U.S.C. § 371 of International Application No. PCT/EP2017/063809, filed Jun. 7, 2017 published as WO 2017/211880 on Dec. 14, 2017, which claims the benefit of European Patent Application Number 16173344.9 filed Jun. 7, 2016. These applications are hereby incorporated by reference herein.

FIELD OF THE INVENTION

The invention generally relates to a correction of inhomogeneities of detector elements of photon-counting radiation detectors. More specifically, the invention relates to a correction device for a radiation detector including detector elements each for detecting photons incident onto the detector element and configured to provide a detection signal in accordance with the detected photons and to a correction method for such a radiation detector.

BACKGROUND OF THE INVENTION

In imaging applications, radiation detectors for detecting x-ray radiation usually consist of a plurality of detector elements often also referred to as pixels. Since the individual detector elements and the associated read-out circuitry are usually not entirely identical, the responses of the detector elements to incident radiation often vary between different detector elements. These varying responses particularly result from gain variations of the detector elements, which may stem from inhomogeneities in the photon conversion yield of the detector elements, losses in charge transport, charge trapping, or variations in the performance of the readout circuitry, for example. These variations can be parameterized by means of an effective area of the detector element. Therefore, these variations are also referred to as gain type or effective area type inhomogeneities herein.

In order to eliminate or reduce image artifacts resulting from effective area type inhomogeneities, a so-called flat-field correction may be carried out. In one implementation, flat-fielding may involve illuminating the radiation detector with homogeneous radiation intensity such that all detector elements would detect the same radiation intensity in an ideal radiation detector. Then, the flat-field correction may be determined on the basis of relative differences between the output signals of the detector elements and a reference, such as a mean output of all detector elements.

Such a flat-field correction provides good results for integrating radiation detectors and also for photon-counting detectors, when such detectors are illuminated with a low radiation flux. Photon-counting or spectral detectors allow for detecting individual incident photons and for determining their energies in accordance with certain energy ranges (often also referred to as energy bins). For instance, such detectors are used in spectral CT scanners utilized in medical and other applications, such as, for example, material testing, in backscatter x-ray scanners used in security applications and in other devices. In these applications, radiation detectors are often operated at a high radiation flux, and it is has been observed that that the flat-field correction does not lead to satisfactory results at high radiation flux. Rather, similar image artifacts as those resulting from effective area type inhomogeneities often re-emerge at high radiation flux also after a flat-fielding of the radiation detector at low radiation flux.

It has been found that this is due to inhomogeneities of the dead times of the detector elements. The dead time of a detector element corresponds to the time after a conversion of an incident photon into an electric signal during which the detector element is not able to unequivocally detect another incident photon. The dead times of different detector elements of a radiation detector usually also varies and, especially at a high photon flux, such variations cause the aforementioned artifacts, which cannot be eliminated by means of the flat-field correction.

WO 2013/144812 A2 discloses an imaging system comprising a photon-counting x-ray detector. The detector has an input photon count rate determiner that determines the input photon count rate from the detected output photon count rate measured on the basis of an output photon count rate to input photon count rate map. The map is generated in an air scan on the basis of a paralyzable detector model and assigns two candidate input photon count rates to each output photon count rate. For a detected output photon count rate, the input photon count rate determiner determines the correct input photon count rate particularly on the basis of a ratio of input photon count rates for detector pixels having different radiation sensitive areas or measured using different shaping times of a shaper assigned to a detector pixel.

SUMMARY OF THE INVENTION

It is an object of the invention to allow for reducing image artifacts caused by dead-time inhomogeneities of a large photon-counting radiation detector, particularly when the radiation detector is illuminated with a high photon flux.

In one aspect, the invention suggests a correction device for a radiation detector including detector elements each for detecting photons incident onto the detector element and configured to provide a detection signal in accordance with the detected photons. The correction device can be coupled to the radiation detector and comprises: (i) an acquisition unit configured to read detection signals representative of an incident photon flux detected by the detector elements for different photon fluxes incident onto the radiation detector, (ii) an evaluation unit configured to determine for each detector element a dead time of the detector element and a parameter representative of an effective area of the detector element on the basis of a collective evaluation of the detection signals of the respective detector element, and (iii) a correction unit configured to determine for each detector element a first correction parameter to compensate for differences in the effective areas of the detector elements and a second correction parameter to compensate for the differences in the dead times of the detector elements on the basis of the determined parameter representative of the effective area and the determined dead time of the detector elements.

Since the correction device is capable of determining correction parameters to compensate for differences in the effective areas and in the dead times of the detector elements on the basis of the collective evaluation of the detector signals, corrections can be applied to the detector output and/or the detector can be adapted with respect to both effective area type and dead time type inhomogeneities. Thus, image artifacts resulting from inhomogeneities of the detector elements can be avoided particularly for high photon fluxes. Moreover, an additional correction of inhomogeneities with respect to low photon fluxes can be dispensed with. Hence, the correction device allows for an especially efficient compensation of inhomogeneities of detector elements with respect to the complete range of photon fluxes.

The term effective area of a detector element as used herein particularly corresponds to the surface area of the detector element through which photons can enter the detector element multiplied by a factor representing contributions to the gain of the detector element which are independent of the incident photon flux or the dead time of detector element, where the gain of the detector element corresponds to the ratio between the incident photon flux and the count rate of detected photons. Thus, the gain at low photon flux substantially corresponds to the aforementioned factor.

Preferably, the correction unit is configured to adapt the radiation detector on the basis of the first and second correction parameters determined for the detector elements.

In one related embodiment, each detector element comprises read-out electronics including at least one first component for providing a signal indicative of a number of photons incident onto the detector element, and the correction device is configured to adapt the at least one first component on the basis of the first correction parameter, the first correction parameter being determined based on the parameter representative of the effective area of the detector element.

The first correction parameter for a detector element may particularly correspond to a ratio between a mean of the determined parameters representative of the effective areas of the detector elements and the value of the parameter determined for the detector element. Such a first correction parameter allows for an efficient compensation for differences in the effective areas of the detector elements.

In a further embodiment, each detector element comprises read-out electronics including at least one second component for providing a signal comprising pulses each being indicative of an amount of charge produced in the detector element by an incident photon, and the correction device is configured to adapt the at least one second component on the basis of the second correction parameter, the second correction parameter being determined based on the dead time of the detector element.

The second correction parameter may correspond to a parameter for adjusting the dead time of the detector element such that the detector elements have approximately equal dead times. Here, the dead time of a detector element particularly includes a contribution of the read-out electronics and on the basis of the second correction parameter, particularly the read-out electronics may be calibrated with respect to their contribution to the dead time.

The relevant second components may particularly comprise an integrating amplifier and a pulse shaper, which integrate the charge produced by a photon and output a pulse having a certain width and a height indicative of the photon energy. The dead time of the detector element is particularly influenced by the pulse width, and the correction device may particularly adjust the pulse width on the basis of the second correction parameter to compensate for the differences of the dead times.

In one embodiment of the invention, the evaluation unit is configured to determine the parameter representative of the effective area of a detector element and the dead time of a detector element on the basis of a model for estimating the radiation flux detected by the detector element as a function of a parameter representative of the incident photon flux. The model may particularly be based on a paralyzable detector model, i.e. model for a detector in which a photon incident during the dead time restarts the dead time interval.

Such a detector model allows for a good approximation of the response of a detector element of a photon-counting radiation detector to incident radiation.

In a related embodiment, the model depends on the parameters representative of the effective area of the detector element and on the dead time of the detector element and wherein the evaluation unit is configured to determine said parameter and the dead time such that differences between the estimated radiation fluxes and the detected radiation fluxes are minimized.

In a further related embodiment, the evaluation unit is configured to generate parameters of a curve fitted to data points each corresponding to a pair of a parameter depending on a detected photon flux and a parameter indicative of the associated incident photon flux, the curve being determined on the basis of the model. Thus, the collective evaluation of the sensor signals involves the fitting of a curve to data points derived from the sensor signals.

In one embodiment of the invention, the model is given by $$m = Q \cdot P \cdot \exp(-Q \cdot P \cdot \tau),$$

where m corresponds to the photon flux detected by the detector element, Q is the parameter representative of the incident photon flux, P is the parameter representative of the effective area of the detector element and t corresponds to the dead time of the detector element.

A related embodiment of the invention comprises that the curve determined on the basis of the model is a straight line given by $$\log(m/Q) = \log(P) - Q \cdot P \cdot \tau,$$

where the function log(.) defines the natural logarithm, and that the evaluation unit determines the parameter representative of the effective area of the detector element on the basis of a y-intercept of the straight line and the dead time of the detector element based on a slope of the straight line. Since the curve to be fitted to the data points is a straight line in this embodiment, the curve fitting has a relative low computational complexity and allows for a fast determination of the correction parameters.

In a further embodiment of the invention, the incident photons are x-ray photons generated in an x-ray tube in accordance with a tube current I so that the incident photon flux is given by $c \cdot I$ with a constant c, where $c \cdot I$ is the parameter indicative of the incident photon flux and where the parameter representative of the effective area of the detector element corresponds to the effective area of the detector element. Moreover, one embodiment of the invention comprises that the tube current I is the parameter indicative of the incident photon flux and that the parameter representative of the effective area of the detector element corresponds to $c \cdot A$, where A is the effective area of the detector element.

In a further aspect, the invention suggests an imaging device comprising the correction device and further comprising the radiation detector. The imaging device may particularly comprise a spectral CT device. In one embodiment, the imaging device further comprises a radiation source, and the correction device is configured to control the radiation source to emit radiation such that the radiation detector is illuminated with the different photon fluxes.

In a further aspect, the invention suggests a correction method for a radiation detector including detector elements each for detecting photons incident onto the detector element and configured to provide a sensor signal in accordance with the detected photons. The correction method comprises: (i) acquiring sensor signals representative of an incident photon flux detected by the detector elements for different photon fluxes incident onto the radiation detector, (ii) determining for each detector element a dead time of the detector element and a parameter representative of an effective area of the detector element on the basis of a collective evaluation of the sensor signals of the respective detector element, and (iii) determining for each detector element a first correction parameter to compensate for differences in the effective areas of the detector elements and a second correction parameter to compensate for the differences in the dead times of the detector elements on the basis of the determined parameter representative of the effective area and the determined dead time of the respective detector element.

Moreover, a computer program may be provided, which comprises program code for instructing a computer device to carry out the method, when the computer device executes the computer program.

It shall be understood that the calibration device of claim 1, the imaging device of claim 13 and the correction method of claim 15 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

In the following drawings:

FIG. 1 schematically and exemplarily shows components of an imaging device including a radiation detector and a correction device coupled thereto, FIG. 2 schematically and exemplarily shows components of a detector element of the radiation detector, FIG. 3a schematically and exemplarily shows detected photon count rates of detector elements having different dead times as a function of an incident photon flux in a first range of the incident photon flux, and FIG. 3b schematically and exemplarily shows detected photon count rates of the detector elements having different dead times as a function of the incident photon flux in a second range of the incident photon flux.

DETAILED DESCRIPTION OF EMBODIMENTS

Figure 3A:
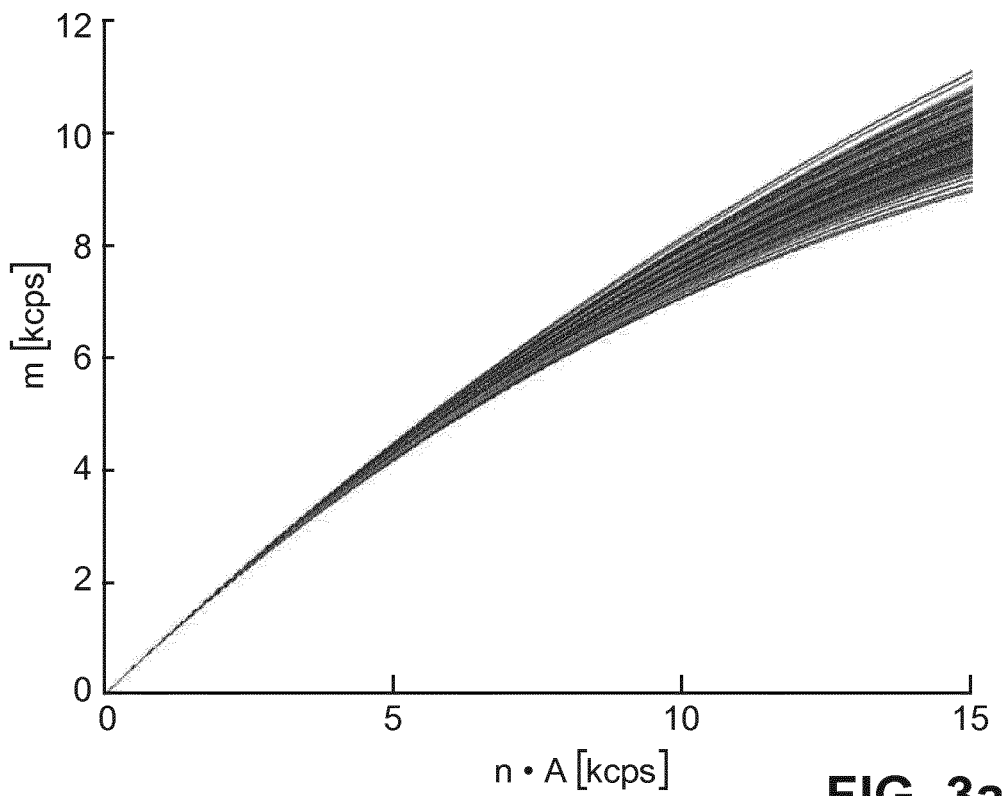

FIG. 1 schematically and exemplarily illustrates a radiation detector 2 for detecting x-ray radiation, which used in an imaging system 1. In the embodiments illustrated in the figures and described in detail herein below, the imaging system 1 is configured as a CT system for generating three-dimensional images of an object in a medical or other application, such as, for example, material testing. In other embodiments, the imaging system 1 may be configured in another way. For instance, the imaging system 1 may comprise a backscatter x-ray scanner including the radiation detector 2.

In addition to the radiation detector 2, the imaging system 1 comprises a radiation source 3, particularly an x-ray source, such as an x-ray tube. The radiation source 3 produces a radiation beam 4 which traverses an examination region 5 which is arranged between the radiation source 3 and the radiation detector 2 in case of a CT system so that the radiation detector 2 detects radiation traversing the examination region 5. In such a system, the radiation source 3 and the radiation detector 2 may particularly be mounted on a rotatable gantry so that they can be rotated around the object to acquire projections at different angles. In case of a backscatter x-ray system, the radiation source 3 and the radiation detector 2 are arranged such that the radiation detector 2 detects radiation reflected by an object in the examination region 5.

The radiation detector 2 and the radiation source 3 may be coupled to a control unit 6 controlling the operation of the x-ray source 2 and the radiation detector 3. The radiation detector 2 is further coupled to a reconstruction unit 7 which reconstructs images on the basis of measurement data collected by the radiation detector 2 in a way known to a person skilled in the art. Since an energy-discriminating photon-counting detector 2 is used which determines photon energies in accordance with predetermined energy ranges, the x-ray images generated by the reconstruction unit 7 may comprise a set of sub-images including one sub-image for each energy range and/or with respect to different materials of interest included in the imaged object (so-called material decomposition). These sub-images may also be combined to form one image for the plural energy ranges.

The control unit 6 and the reconstruction unit 7 may be configured as computer devices which comprise processor units to execute computer programs implementing the routines carried out by the control unit 6 and the reconstruction unit 10. In one embodiment, the control unit 6 and the reconstruction 7 are implemented in separate computer devices. However, it is likewise possible that the control unit 6 and the reconstruction unit 7 are included in a single computer device and implemented in several processor units or a single processor unit of the computer device.

The radiation detector 2 is configured as a photon-counting detector which is capable of detecting single incident x-ray photons and allows for determining their energies in accordance with a number of predefined energy bins. In this regard, a photon incident into the radiation detector 2 produces an electric charge cloud of charge carriers (electrons and holes) which drift to detector electrodes, where the amount of charge depends on the energy of the incident x-ray photon. The generated charges are collected by readout electronics of the radiation detector 2, which in turn generates an electrical signal (e.g. a voltage signal) the amplitude of which is proportional to the energy of the impinging x-ray photon.

To this end, the radiation detector 2 comprises a plurality of detector elements 201, which are arranged in an array that may be flat or concave. Thus, the detector elements 201 are arranged in the form of rows and columns arranged perpendicular to each other. Preferably, all detector elements 201 are of the same type. In FIG. 2, components of one of the detector element 201 are schematically and exemplarily depicted with respect to one embodiment.

In accordance with the illustrated embodiment, each detector element 201 comprises a converter element 202 for converting X-rays into electrical signals, which element is provided between a cathode contact 203 and an anode contact 204. The converter element 202 is made of a semiconductor material, where suitable semiconductor materials are, for example, cadmium telluride (CdTe), cadmium zinc telluride (CdZnTe), cadmium tellurium selenide (CdTeSe), CdZnTeSe, cadmium manganese telluride (CdMnTe), silicon (Si), gallium arsenide (GaAs), perovskites and mercury iodide (HgI). The cathode contact 203 is generally held on a lower electric potential than the anode contact 204 (i.e. a negative bias voltage is applied to the cathode contact 203 with respect to the anode contact 203) so that an electric field is formed between the cathode contact 203 and the anode contact 204 within the converter element 202. X-ray photons may enter into the converter element 202 through the cathode contact 203, and the electric field may be substantially parallel to the (main) beam direction of the incident radiation beam 4.

The converter element 202 may span plural detector elements 201 and may be configured as a substantially cubic block having lateral dimensions that are much larger than its thickness. The cathode contact 203 and the anode contact 204 may be connected to the large top and bottom sides of the converter element 202 so that the electric field extends along the smaller thickness direction of the converter element 202. Further, the cathode electrode 203 may be configured as a continuous cathode electrode, which may be formed by a thin metalized film applied onto the converter element 202 and which may form the cathode electrode of plural detector elements 201. The anode contact 204 of a detector element 201 may be configured as an anode pixel, which is separated from anode contacts of other detector elements 201.

The anode contact 204 and cathode contact 203 collect charge produced by photons incident on the converter element 202 and are connected to readout electronics 205 which collect the resulting current and determine the measurement data which are subsequently provided to the reconstruction unit 7. Thus, when an x-ray photon enters into the converter element 202, it excites the semiconductor material and thereby generates electric charge carriers (electrons and holes). The charge carriers drift to the cathode contact 203 or the anode contact 204 under the influence of the electric field in the converter element 202 and produce the aforementioned electric signal pulse collected by the read-out electronics 205, which may be implemented in a CMOS ASIC structure attached to the anode side of the converter element, for example.

The readout electronics 205 may particularly include an integrating amplifier 206, such as a charge sensitive amplifier, which integrates the input current of each event (e.g. an incident x-ray photon) and produces a corresponding step-like output voltage signal, where the step-height is proportional to the energy of the photon. The amplifier output signal is filtered in a so-called pulse shaper circuit 207 to produce a voltage signal in which each step generated by the integrating amplifier 206 corresponds to a pulse having a certain width and a gradually rounded maximum, the amplitude of which is proportional to the height of the step (i.e. to the integrated charge of the charge cloud generated by an incident x-ray photon). For this purpose, the pulse shaper circuit 207 particularly sets the duration of the pulse. Thus, the pulse shaper circuit 207 limits the decay time of the step like output signal of the amplifier 206, which corresponds to a pulse having a very long decay time. In addition, the pulse shaper circuit 207 increases the rise time of the step-like amplifier output signal.

The selected shape and particularly the selected width of the pulses generated by the pulse shaper circuit is a compromise between two conflicting goals. On the one hand, the pulse width should be large in order to reduce noise. On the other hand, the successive pulses should not overlap in order to be able to distinguish them and the associated photon events. In view of this, the pulse shaper circuit 207 is configured such that pulse width is as small as possible to achieve an acceptable signal-to-noise ratio.

Further, the read-out electronics 205 may comprise two or more pulse discriminators $208_1, \ldots, 208_N$, where each pulse discriminator compares the output signal of the amplifier shaper 206 with a predetermined threshold value $S_i$ (i=1, ..., N) and produces an output signal, if the output of the amplifier shaper exceeds the threshold value $S_i$. The threshold values $S_i$ of these pulse discriminators $208_1, \ldots, 208_N$ represent the boundaries of the aforementioned energy bins. They may be selected such that a pulse in the output signal of the shaper circuit 207, which corresponds to a photon having an energy within a range corresponding to a certain energy bin, has an amplitude between the threshold values corresponding to the upper and lower boundaries for the energy bin. The corresponding configuration of the threshold values $S_i$ may be provided within the scope of a calibration procedure, which may be carried out in a way known to the person skilled in the art as such. The output of each discriminator $208_1, \ldots, 208_N$ may be connected to an associated counter $209_1, \ldots, 209_N$ for counting the number of photons registered in the discriminator $208_1, \ldots, 208_N$. In accordance with this configuration, each photon produces a count with respect to the energy bin corresponding to its energy and with respect to the lower energy bins. Thus, the number of photons within a certain energy bin can be determined on the basis of differences between the counter values. In particular, the counts for the highest energy bin correspond to the number of photons with an energy in this energy bin. The number of photons with energies in a lower energy bin can determined based on the differences between the number of photons with an energy in the next-higher bin and the counts for the respective energy bin.

On this basis, the read-out electronics 205 may determine the number and the rate of incident photons (i.e. the number of photons per unit time interval) per energy bin. The determined rate information may be provided to the reconstruction unit 7 via a processing circuit 210 of the read-out electronics 203 and on the basis of this information, the reconstruction unit 10 may reconstruct spectral images of the object positioned in the examination region 5 for each of the energy ranges corresponding to the energy bins. These images correspond to the aforementioned sub-images, which may be further evaluated separately or which may be combined to form a single x-ray image.

Also in case the detector elements 201 of the radiation detector 2 are of the same type, the responses of the detector elements 201 to incident radiation vary. These varying responses have flux-independent and flux-dependent contributions. The flux-independent variations result from inhomogeneities of the gains of the detector elements 201 at low photon flux and can be parameterized as variations of the effective area of the detector elements 201. The flux-dependent contributions particularly result from variations of the dead time of the detector elements 201.

The dead time corresponds to the time interval after a detection event during which a detector element cannot unequivocally detect a further incident photon. It includes several contributions, particularly a contribution of the intrinsic dead time of the conversion element 202 and a contribution of the read-out electronics 205, where the latter is particularly influenced by the widths of the pulses formed by the pulse shaper circuit 207. In this regard, the read-out electronics 205 (particularly the discriminators $208_1, \ldots, 208_N$) can only distinguish successive pulses which have a certain maximum overlap. In case the overlap exceeds this maximum, the pulses cannot be distinguished. This leads to a dead-time interval which has a length corresponding to the time distance between to pulses having the maximum overlap. The length of this dead-time interval therefore increases with an increasing pulse width.

Variations of the effective area of the detector elements 201 also occur at low photon flux (i.e. when the time interval between two incident photons is larger than the dead time) and can be corrected by means of a flat-field correction at a low radiation flux. At higher radiation fluxes, the variations of the dead time have a larger influence than at lower radiation fluxes. However, these variations cannot be compensated for by means of a flat-field correction made at low radiation flux.

Figure 3B:
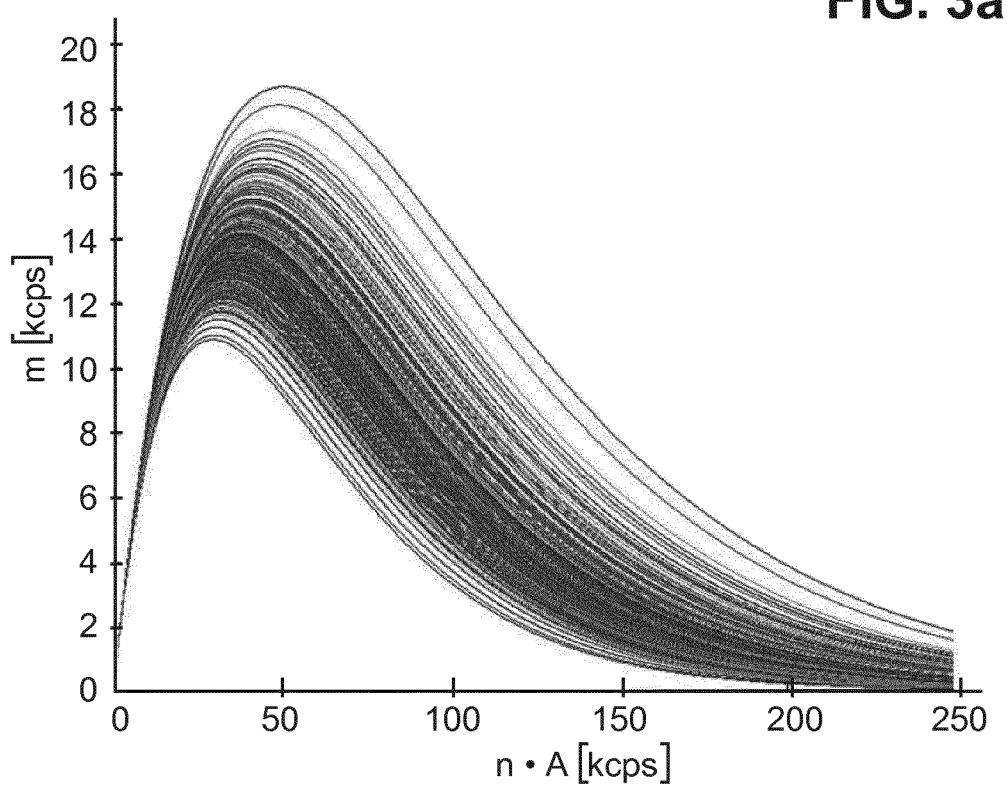

In FIGS. 3a and 3b, the effect of the inhomogeneities of the dead times of the detector elements 201 is illustrated on the basis of a simulation provided based on a paralyzable detector model. In such a detector model, the detected count rate m can be calculated according to:

$$m = n \cdot A \cdot e^{-n \cdot A \cdot \tau} \quad (1)$$

where n is the rate of incoming photons per surface area, A is the effective area of the detector element 201 an τ is the dead time of the detector element 201. In FIGS. 3a and 3b, the count rate m is shown as a function of the incoming photon rate per surface area for different simulated detector elements having the same effective area A but different dead times τ. The dead times τ are assumed to be distributed in accordance with a Gaussian distribution with a mean value of τ=23 μs and a standard deviation of τ=2.3 μs.

In FIG. 3a, the count rate m is shown for incoming photon rates nA up to 15 kcps (kilocounts per second). It can be seen in the figure that for such low fluxes the variations of the count rate m are relatively small. In FIG. 3b, the count rate m is shown for incoming photon nA rates up to 250 kcps. As can be seen in the figure, the variations of the count rate m are significantly higher for high incoming photon rates nA.

In order to correct particularly for such variations of the dead times of different detector elements 201 and avoid image artifacts resulting from these variations, a correction procedure is carried out. The procedure may particularly be carried out in a correction module 8 integrated in the control unit 6. Likewise, the correction module 8 may be integrated into another unit, such as the reconstruction unit 7, or it may be configured as a separate component of the imaging system 1.

In the correction procedure, parameters representative of the dead times of the detector elements 201 are determined, and at the same time parameters representative of the effective areas of the detector elements are determined. On the basis of these parameters, the read-out electronics 205 of the detector elements 201 are adapted and/or the detection signals output by the radiation detector 2 are modified. Since the procedure allows to compensate for both effective area type inhomogeneities and dead time type inhomogeneities, no further compensations for inhomogeneities of detector elements 201 are required. In particular, an additional flat-fielding of the radiation detector 2 can be dispensed with.

The correction module 8 determines the dead times and effective areas of the detector elements 201 of the radiation detector 2 on the basis of plural count rates m measured for each detector element 201 at different incoming photon rates per surface area. For carrying out the measurement, the radiation detector 2 is preferably illuminated with a homogenous intensity. For this purpose, any beam shaping filters, such as bowtie filters, may be removed (if used in normal operation). In order to illuminate the radiation detector 2 with different incoming photon rates per surface area, the intensity of the radiation emitted by the radiation source 3 may be varied. This variation may be controlled by the correction module 8 in accordance with a predefined routine. During this routine, the correction module 8 may control the radiation detector 3 to emit radiation with an intensity that increases during the routine (however, other variation patterns can likewise be used). In case the radiation source 3 is configured as an x-ray tube, the control unit 6 may particularly vary the tube current in order to vary the intensity of the emitted radiation and, thus, the incoming photon rate per surface area at the radiation detector 2.

For each detector element 201, the count rates m are measured for the different incoming photon rates n, and the measured count rates m and the associated incoming photon rates n and/or parameters indicative thereof (such as the tube currents) are read by an acquisition unit 9 of the correction module 8 and stored in the correction module 8. Using the stored data, an evaluation unit 10 of the correction module determines the dead time parameters and the effective area parameters of the detector elements 201 on the basis of a detector model, which allows for estimating the count rate m as a function of the incoming photon rate n and/or the parameter indicative thereof and which includes the dead time and the effective area of the detector elements as parameters. For each detector element 201, the evaluation unit 10 may determine the dead time parameter and the effective area parameter such that the differences between the measured count rates m and the corresponding count rates estimated by means of the model are minimized in accordance with a predefined criterion.

In one implementation, the dead times and effective areas of the detector elements 201 of the radiation detector 2 are determined using a paralyzable detector model. In particular, a model may be used which is similar to the model underlying equation (1). In the model, it may be assumed that the incoming photon rate is proportional to the tube current I of the x-ray tube, i.e. n=c·I with a constant c. Thus, the count rate m in the model is given by $$m = I \cdot c \cdot A \cdot e^{-I \cdot c \cdot A \cdot \tau}. \quad (2)$$

This equation can be modified to achieve a linear function of log(m/I) dependent on I:

$$\log(m/I) = \log(c \cdot A) - c \cdot A \cdot \tau \cdot I, \quad (3)$$

where log(.) denotes the natural logarithm. On the basis of this equation and on the basis of the measured count rates m and the associated tube currents I, the evaluation unit may fit a straight line (i.e. a linear function y=a·x+b) to the pairs (I, log(m/I)) determined using the measured data (i.e. the data pairs (I, log(m/I)) correspond to the pairs (x, y) of the straight line). Such a fitting minimizes the differences between the measured count rates m and the corresponding estimates of the count rates in the model in accordance with a criterion, which is determined by the applied fitting technique, where any suitable fitting technique known to the person skilled in the art may be used. The y-intercept b of the fitted straight line corresponds to log(c·A), and allows for calculating the effective area parameter c·A according to c·A=exp(b). The slope a of the straight line corresponds to −c·A·τ. Thus, the dead time can be calculated from the slope a and the y-intercept b of the straight line according to $$\tau = -\frac{a}{c \cdot A} = -a \cdot e^{-b}. \quad (4)$$

The constant c may be determined in a further procedure. In this case, the effective area A can be determined and used in the correction of the effective area type inhomogeneities of the detector elements. In an alternative implementation, the correction of these inhomogeneities is made on the basis of the parameter c·A.

In both implementations, the correction of the effective area type inhomogeneities may be made similar to the conventional flat-field correction and involve a correction parameter determined in a correction unit 11 of the correction module. In particular, the correction unit 11 may calculate a mean effective area or a mean of the parameter c·A of the detector elements 201 on the basis of the effective areas or values of the parameters c·A determined as explained above. Then, the correction unit 10 may determine a correction factor for each detector element 201, which may correspond to the ratio of the determined mean and the effective area or value of the parameters c·A determined for the respective detector element 201. The actual correction is then carried out by correcting the photon numbers or rates determined using the counters $209_1, \ldots, 209_N$ using the correction factor. For this purpose, the correction factor may be applied to the signal representing the photon numbers or rates by the readout electronics 205, particularly by the processing circuit 210. As an alternative the correction factor may be applied by the reconstruction unit 7, when generating images from the detection signals provided by the radiation detector 2.

In order to compensate for the dead time type inhomogeneities of the detector elements 201, the correction unit 11 may calibrate the read-out electronics 205 of the detector elements 201 such that all detector elements 201 have an at least approximately equal dead time. Thus, a calibration of the contribution of the read-out electronics 205 to the dead time is made on the basis of the dead times of the detector elements 201 determined as explained above. In order to adjust this contribution, the correction unit 11 may particularly adjust the pulse width of the pulses generated by the pulse-shaper circuit. In particular, the correction unit 11 may increase the pulse width in order to increase the dead time of a detector element 201 and decrease the pulse width in order to decrease the dead-time. Preferably, these adjustments are made within the limits imposed by the desired minimum signal-to-noise ratio. Thus, the pulse width is only reduced such that an acceptable signal-to-noise level is still achieved.

In order to adjust the pulse-width, the correction unit 11 may adjust the gain of the amplifier 206 in one implementation. Such an adjustment results in a changed pulse height and, thus, also in a changed pulse width. Upon such an adjustment, a new energy calibration of the read-out electronics 205 may be carried out in order to compensate for the changes of the pulse height which is the basis for the energy determination. Likewise, the correction unit 11 may adjust the pulse width in another way. In this regard, the amplifier 206 and the shaper circuit 207 usually provide a number of tuning capabilities for adjusting the pulse width, which are known to a person skilled in the art as such.

As was described above, inhomogeneities of detector elements of a radiation detector may be compensated in a spectral CT system or another spectral x-ray device detecting radiation transmitting an object to be imaged. In a similar way, detector elements of a radiation detector can be compensated in imaging system detecting radiation reflected by an object, such as backscatter x-ray scanners. Here, the radiation from the included x-ray source may be guided to the radiation detector by means of reflective elements in order to acquire the measurement data used for determining the correction factors, or the radiation detector may be illuminated using an additional x-ray source emitting in a direction towards the radiation detector.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A correction device for a radiation detector including detector elements each for detecting photons incident onto the detector element and configured to provide a detector signal in accordance with the detected photons, wherein the correction device can be coupled to the radiation detector and comprises:
   an acquisition unit configured to read detection signals representative of an incident photon flux detected by the detector elements for different photon fluxes incident onto the radiation detector,
   an evaluation unit configured to determine for each detector element a dead time of the detector element and a parameter representative of an effective area of the detector element on the basis of a collective evaluation of the detection signals of the respective detector element, and
   a correction unit configured to determine for each detector element a first correction parameter to compensate for differences in the effective areas of the detector elements and a second correction parameter to compensate for the differences in the dead times of the detector elements on the basis of the determined parameters representative of the effective area and the determined dead times of the detector elements.

2. The correction device as defined in claim 1, wherein each detector element comprises read-out electronics including at least one first component for providing a detection signal indicative of a number of photons incident onto the detector element, and wherein the correction device is configured to adapt the at least one first component on the basis of the first correction parameter, the first correction parameter being determined based on the parameter representative of the effective area of the detector element.

3. The correction device as defined in claim 1, wherein the first correction parameter for a detector element corresponds to a ratio between a mean of the determined parameters representative of the effective areas of the detector elements and the value of the parameter determined for the detector element.

4. The correction device as defined in claim 1, wherein each detector element comprises read-out electronics including at least one second component for providing a detection signal comprising pulses each being indicative of an amount of charge produced in the detector element by an incident photon, and wherein the correction device is configured to adapt the at least one second component on the basis of the second correction parameter, the second correction parameter being determined based on the dead time of the detector element.

5. The correction device as defined in claim 1, wherein the second correction parameter corresponds to a parameter for adjusting the dead time of the detector element such that the detector elements have approximately equal dead times.

6. The correction device as defined in claim 1, wherein the evaluation unit is configured to determine the parameter representative of the effective area of a detector element and the dead time of a detector element on the basis of a model for estimating the radiation flux detected by the detector element as a function of a parameter representative of the incident photon flux.

7. The correction device as defined in claim 6, wherein the model depends on the parameters representative of the effective area of the detector element and on the dead time of the detector element and wherein the evaluation unit is configured to determine said parameter and the dead time such that differences between the estimated radiation fluxes and the detected radiation fluxes are minimized.

8. The correction device as defined in claim 6, wherein the evaluation unit is configured to generate parameters of a curve fitted to data points each corresponding to a pair of a parameter depending on a detected photon flux and a parameter indicative of the associated incident photon flux, the curve being determined on the basis of the model.

9. The correction device as defined in claim 6, wherein the model is given by $$m = Q \cdot P \cdot \exp(-Q \cdot P \cdot \tau),$$

where m corresponds to the photon flux detected by the detector element, Q is the parameter representative of the incident photon flux, P is the parameter representative of the effective area of the detector element and $\tau$ corresponds to the dead time of the detector element.

10. The correction device as defined in claim 8, wherein the curve is a straight line given by $$\log(m/Q) = \log(P) - Q \cdot P \cdot \tau,$$

where the function log(.) defines the natural logarithm and wherein the evaluation unit determines the parameter representative of the effective area of the detector element on the basis of a y-intercept of the straight line and the dead time of the detector element based on a slope of the straight line.

11. The correction device as defined in claim 6, wherein the incident photons are x-ray photons generated in an x-ray tube in accordance with a tube current I so that the incident photon flux is given by c·I with a constant c, wherein c·I is the parameter indicative of the incident photon flux and wherein the parameter representative of the effective area of the detector element corresponds to the effective area of the detector element.

12. The correction device as defined in claim 6, wherein incident radiation is x-ray radiation generated in an x-ray tube in accordance with a tube current I so that the incident photon flux is given by c·I with a constant c, wherein the tube current I is the parameter indicative of the incident photon flux and wherein the parameter representative of the effective area of the detector element corresponds to c·A, where A is the effective area of the detector element.

13. An imaging device comprising the correction device as defined in claim 1 and further comprising the radiation detector.

14. The imaging device as defined in claim 13, further comprising a radiation source, wherein the correction device is configured to control the radiation source to emit radiation such that the radiation detector is illuminated with the different photon fluxes.

15. A correction method for a radiation detector including detector elements each for detecting photons incident onto the detector element and configured to provide a detection signal in accordance with the detected photons, wherein the correction method comprises:
  acquiring detection signals representative of an incident photon flux detected by the detector elements for different photon fluxes incident onto the radiation detector,
  determining for each detector element a dead time of the detector element and a parameter representative of an effective area of the detector element on the basis of a collective evaluation of the detection signals of the respective detector element, and
  determining for each detector element a first correction parameter to compensate for differences in the effective areas of the detector elements and a second correction parameter to compensate for the differences in the dead times of the detector elements on the basis of the determined parameters representative of the effective area and the determined dead times of the detector elements.

* * * * *